United States Patent
Stewart et al.

(10) Patent No.: US 9,325,578 B2
(45) Date of Patent: Apr. 26, 2016

(54) OPTIMIZING AUTOMATION SETTINGS USING CROWDSOURCING

(71) Applicant: LENOVO (Singapore) PTE, LTD., New Tech Park (SG)

(72) Inventors: Aaron Michael Stewart, Raleigh, NC (US); Michaela Rose Case, Raleigh, NC (US); Howard Locker, Cary, NC (US); John Weldon Nicholson, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/137,361

(22) Filed: Dec. 20, 2013

(65) Prior Publication Data
US 2015/0180713 A1    Jun. 25, 2015

(51) Int. Cl.
*G06F 15/16* (2006.01)
*H04L 12/24* (2006.01)

(52) U.S. Cl.
CPC ........ *H04L 41/0813* (2013.01); *H04L 41/0886* (2013.01)

(58) Field of Classification Search
CPC . H04L 67/12; H04L 12/2803; H04L 12/2812; H04L 12/282; H04L 12/2827; H04L 12/283; G06Q 40/08; G06Q 50/01; H04W 36/32
USPC ......................................... 709/217
See application file for complete search history.

(56) References Cited

U.S. PATENT DOCUMENTS

| | | | |
|---|---|---|---|
| 2011/0173542 A1* | 7/2011 | Imes et al. | 715/735 |
| 2012/0046796 A1* | 2/2012 | Zhang | 700/291 |
| 2013/0234840 A1* | 9/2013 | Trundle et al. | 340/12.53 |
| 2014/0201315 A1* | 7/2014 | Jacob et al. | 709/217 |

* cited by examiner

*Primary Examiner* — Brian J Gillis
*Assistant Examiner* — Kamran Mohammadi
(74) *Attorney, Agent, or Firm* — Kunzler Law Group

(57) ABSTRACT

An apparatus, program product, and method are disclosed for receiving an automation setting from a sharing participant, the automation setting being associated with the sharing participant, comparing the received automation setting to a corresponding local automation setting, and adjusting the local automation setting based on the comparison of the received automation setting to the corresponding local automation setting.

18 Claims, 7 Drawing Sheets

OPTIMIZING AUTOMATION SETTINGS USING CROWDSOURCING

FIELD

The subject matter disclosed herein relates to automation systems and more particularly relates to optimizing automation system settings using crowdsourcing.

BACKGROUND

Description of the Related Art

Automation systems provide remote and automatic control of various interconnected devices within a home or office, such as climate control systems, security systems, appliances, irrigation systems, etc. A homeowner, for example, may set a schedule on an automation device, such as a smart thermostat, and the device may run according to the preferences of the homeowner. Users may also adjust automation device settings using a connected mobile device, such as a smart phone or tablet computer. Home automation systems may also alert a homeowner of certain events, such as water leaks or security breaches.

Even though automation systems may provide many conveniences to a user, an automation system may still require a user to specify various automation settings. A user, however, may not know how to configure the automation devices such that they run as efficiently as possible. Crowdsourcing is a way to obtain ideas, content, information, etc., from a large group of people and may be particularly effective when obtaining information from an interconnected, online community. Thus, it may be desirable to incorporate crowdsourcing features into an automation system such that automation settings may be shared among multiple users in order to set an automation system to run as efficiently as possible.

BRIEF SUMMARY

A method for optimizing automation settings using crowdsourcing is disclosed. An apparatus and computer program product also perform the functions of the method.

In one embodiment, a method is described that includes receiving an automation setting from a sharing participant. In certain embodiments, the automation setting is associated with the sharing participant. In another embodiment, the method includes comparing the received automation setting to a corresponding local automation setting. In one embodiment, the method includes adjusting the local automation setting based on the comparison of the received automation setting to the corresponding local automation setting.

The method, in some embodiments, includes determining a geographic proximity to the sharing participant. In one embodiment, the local automation setting is adjusted according to the geographic proximity. In a further embodiment, the method includes receiving location specific data associated with the sharing participant. In one embodiment, the local automation setting is adjusted according to the location specific data. In another embodiment, the method includes receiving data associated with a sharing participant. In some embodiments, the local automation setting is adjusted according to the data, which includes information associated with the schedule of the sharing participant In one embodiment, the method includes receiving presence data associated with the sharing participant. In another embodiment, the local automation settings is adjusted according to the presence data and the presence data includes information associated with the presence of a sharing participant. In a further embodiment, the method includes receiving energy usage data associated with the sharing participant. In some embodiments, the local automation setting is adjusted according to the energy usage data.

In another embodiment, the method includes sending a notification in response to modification of the local automation setting. In one embodiment, the notification includes information associated with the local automation setting. In some embodiments, the method includes inviting a non-participant having a shareable automation setting to share the shareable automation setting.

In one embodiment, the method includes receiving immediate-response data, which may include information associated with an event. In certain embodiments, the event is associated with a sharing participant such that the local automation setting is immediately adjusted based on the immediate-response data.

The apparatus, in one embodiment, includes an automation device that includes a processor and a memory storing machine readable code executable by the processor. In one embodiment, the machine readable code includes a settings module configured to receive an automation setting from a sharing participant. In one embodiment, the automation setting is associated with the sharing participant.

In another embodiment, the machine readable code includes a matching module configured to compare the received automation setting to a corresponding local automation setting. In one embodiment, the machine readable code includes a regulating module configured to adjust the local automation setting based on the comparison of the received automation setting to the corresponding local automation setting.

The machine readable code, in one embodiment, includes a proximity module configured to determine a geographic proximity to the sharing participant. In one embodiment, the local automation setting is adjusted according to the geographic proximity. The machine readable code, in another embodiment, includes a location module configured to receive location specific data associated with the sharing participant. In certain embodiments, the local automation setting is adjusted according to the location specific data. In another embodiment, the machine readable code includes a schedule module configured to receive data associated with a sharing participant. In one embodiment, the local automation setting is adjusted according to the data, which includes information associated with the schedule of the sharing participant The machine readable code, in one embodiment, includes a presence module configured to receive presence data associated with the sharing participant. In one embodiment, the local automation setting is adjusted according to the presence data and the presence data includes information associated with the presence of the sharing participant.

In another embodiment, the machine readable code includes a usage module configured to receive energy usage data associated with the sharing participant. In some embodiments, the local automation setting is adjusted according to the energy usage data. In certain embodiments, the machine readable code includes a notification module configured to send a notification in response to modification of the local automation setting. In one embodiment, the notification includes information associated with the local automation setting. In a further embodiment, the machine readable code includes a request module configured to invite a non-participant having a shareable automation setting to share the shareable automation setting.

In one embodiment, the machine readable code includes an immediate-response module configured to receive immediate-response data. In another embodiment, the immediate-response data includes information associated with an event. In a further embodiment, the event is associated with the sharing participant such that the local automation setting is immediately adjusted based on the immediate-response data.

A program product is disclosed including a computer readable storage medium storing machine readable code executable by a processor to perform the operations. In one embodiment, the operations include receiving an automation setting from a sharing participant. In certain embodiments, the automation setting is associated with the sharing participant. In another embodiment, the operations include comparing the received automation setting to a corresponding local automation setting. In one embodiment, the operations include adjusting the local automation setting based on the comparison of the received automation setting to the corresponding local automation setting.

In another embodiment, the operations include receiving immediate-response data, which may include information associated with an event. In certain embodiments, the event is associated with a sharing participant such that the local automation setting is immediately adjusted based on the immediate-response data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
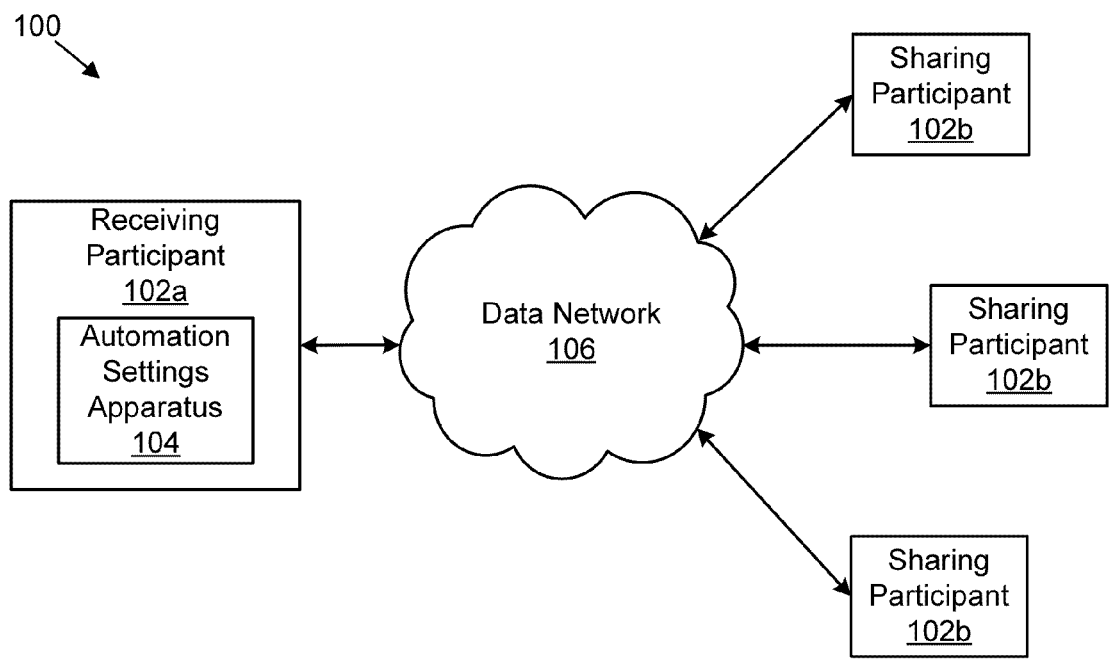
FIG. 1 is a schematic block diagram illustrating one embodiment of a system for optimizing automation settings using crowdsourcing in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements. FIG. 1 depicts one embodiment of a system 100 for optimizing automation settings using crowdsourcing. In an embodiment, the system 100 includes a receiving participant 102a, one or more sharing participants 102b, an automation settings apparatus 104, and a data network 106, which are described in more detail below.

In one embodiment, the system 100 includes a receiving participant 102a configured to receive one or more automation settings from one or more sharing participants 102b. In certain embodiments, the automation settings are associated with one or more automation systems being used by the owner of the sharing participant 102b. In a further embodiment, the automation settings are the settings currently in use by the sharing participants 102b. The receiving participant 102a, in some embodiments, is also a sharing participant 102b and is configured to share one or more automation settings with other participants 102. In certain embodiments, the receiving participant 102a includes one or more home automation systems, such as a climate control system, a security system, and/or the like. For example, a home climate control system may receive one or more climate control settings from the one or more sharing participants 102b, such as the temperature settings of a sharing participant 102b at a certain time of day. The receiving participant 102a may then adjust the home climate control settings based on the climate control settings received from the sharing participant 102b (e.g., by changing the settings on a thermostat).

In another example, a receiving participant 102a may include a home security system. The home security system may receive one or more security system settings from one or more sharing participants 102b and make adjustments to the home security system based on the received settings. For example, the home security system associated with the receiving participant 102a may adjust security camera settings, access settings, lock down settings, and/or the like. The receiving participant 102a may include other automation systems, such as home irrigation systems (e.g., lawn sprinklers), lighting systems, home entertainment systems, appliances, and/or the like.

In certain embodiments, the receiving participant 102a and the one or more sharing participants 102b are in communication over a data network 106, which is described in more detail below. For example, the receiving participant 102a may receive automation settings from a sharing participant 102b located anywhere in the world using a global data network, such as the Internet. In other embodiments, the receiving participant 102a and the sharing participants 102b may communicate using a private network. In some embodiments the participants 102 may share and receive automation settings using a centralized and/or decentralized peer-to-peer network.

In some embodiments, the receiving participant 102a receives additional information associated with the automation settings, such as proximity information, location information, schedule information, presence information, usage information, and/or the like. The receiving participant 102a, in certain embodiments, determines whether and/or how to adjust local automation settings based on the additional information. For example, a receiving participant 102a located in a warm climate environment may not make climate adjustment based on climate control settings received a user located in a cold climate environment.

In one embodiment, the participants 102 opt-in to sharing and/or receiving automation settings. In some embodiments, a user may elect to opt-in to sharing/receiving automation settings using a web interface, such as a website, a social networking site (e.g., Facebook), a mobile application, and/or the like. In other embodiments, a user may elect to share and/or receive home automation settings using a home automation device, such as a smart thermostat, a security system control panel, and/or the like. In some embodiments, the user may select the types of automation settings to share and/or receive. For example, a user may select to share only climate control settings while receiving climate control and security system settings.

In another embodiment, the system 100 includes one or more sharing participants 102b. The one or more sharing participants 102b, in some embodiments, are configured to share one or more automation settings with one or more receiving participants 102a. In certain embodiments, the one or more sharing participants 102b are also embodied as receiving participants 102a, as described above. The sharing participants 102b may be located at various locations, such as homes, offices, retail stores, industrial businesses, and/or the like. The sharing participants 102b, in some embodiments, share various automation settings, such as climate control settings, security settings, irrigation settings, home entertainment settings, appliance settings, and/or the like. Even though only three sharing participants 102b are depicted, any number of sharing participants 102b may be incorporated into the system 100.

In certain embodiments, the receiving 102a and sharing 102b participants are divided into groups/communities, such that receiving participants 102a only receive automation settings from sharing participants 102b that are in the same group as the receiving participants 102a. In certain embodiments, the participants 102 may be members of multiple groups. In another embodiment, a participant 102 may customize a group by selecting specific participants 102 to be part of the group. For example, a participant 102 may select their neighbors that are within a close proximity to form a group, which may provide sharing and receiving automation settings that are more relevant to the participant's 102 area. In certain embodiments, groups may be created using a social network platform, such as Facebook®, or may be created by participants 102 manually entering group information, such as a group identifier, to join an already created group.

The system 100, in one embodiment, includes an automation settings apparatus 104 configured to send and/or receive one or more automation settings to/from the participants 102. In another embodiment, the automation settings apparatus 104 adjusts one or more local automation settings based on one or more received automation settings. In certain embodiments, the automation settings apparatus 104 is located on a receiving participant 102a or a sharing participant 102b. In some embodiments, portions of the automation settings apparatus 104 are located on the both the receiving 102a and sharing 102b participants. The automation settings apparatus 104 may include one or more modules, which are described below in more detail with reference to FIGS. 2 and 3, to perform the operations of sending/receiving automation settings and adjusting one or more local automation settings.

In another embodiment, the system 100 includes a data network 106. The data network 106, in certain embodiments, is a digital communication network 106 that transmits digital communications related to optimizing automation settings. The digital communication network 106 may include a wireless network, such as a wireless telephone network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 may include one or more servers, routers, switches, and/or other networking equipment.

The digital communication network 106 may also include computer readable storage media, such as a hard disk drive, an optical drive, non-volatile memory, random access memory ("RAM"), or the like.

Figure 2:
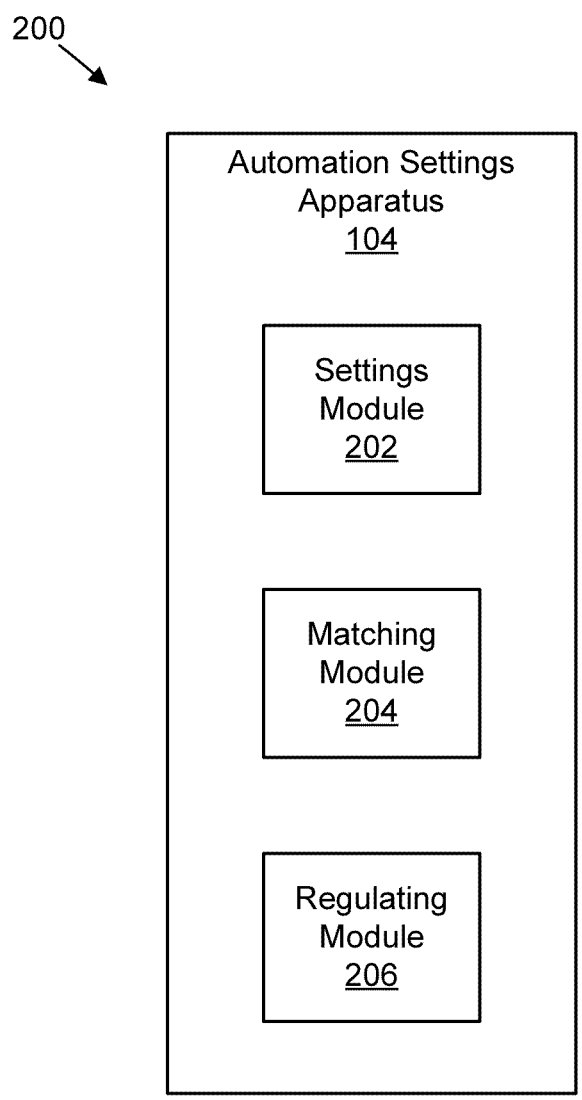
FIG. 2 is a schematic block diagram illustrating one embodiment of an apparatus for optimizing automation settings using crowdsourcing in accordance with the present subject matter.

FIG. 2 depicts one embodiment of an apparatus 200 for optimizing automation settings using crowdsourcing. In certain embodiments, the apparatus 200 includes an automation settings apparatus 104. The automation settings apparatus 104, in an embodiment, includes a settings module 202, a matching module 204, and a regulating module 206, which are described below in more detail.

The automation settings apparatus 104, in one embodiment, includes a settings module 202 configured to receive one or more automation settings from one or more sharing participants 102b. In certain embodiments, the one or more automation settings are associated with the one or more sharing participants 102b. For example, the settings module 202 may receive climate control settings from one sharing participant 102b and security system settings from a different sharing participant 102b. In one embodiment, the settings module 202 receives the one or more automation settings using the data network 106.

In some embodiments, the settings module 202 receives automation settings that have been specified by a user. For example, the user may choose to only receive climate control automation settings and not security system settings. The settings module 202 may filter out received automation settings that do not meet the specifications of the user. In another embodiment, the settings module 202 filters automation settings based on various criteria, including location, proximity, schedule, and/or the like, of the sharing participant 102b associated with the received settings.

In another embodiment, the settings module 202 periodically polls one or more sharing participants 102b to check if there are automation settings available. In certain embodiments, a user determines how often the settings module 202 polls the one or more sharing participants 102b. For example, a user may set the settings module 202 to poll for climate control settings every two hours such that the local automation settings are not constantly adjusted. Alternatively, a user may set the settings module 202 to poll for climate control settings every five minutes in order to finely tune one or more local climate control automation settings by frequently receiving climate control settings.

The settings module 202, in one embodiment, prioritizes received automation settings based on one or more prioritization criteria, such as proximity of the sharing participant 102b to the receiving participant 102a, location specific information associated with the sharing participant 102b, and/or the like. For example, the settings module 202 may place a higher priority on security settings received from a sharing participant 102b in closer proximity to the receiving participant 102a than a sharing participant 102b that may be located further away. In certain embodiments, the settings module 202 may tag the data with a priority level, which may then be processed by the matching module 204, which is described below.

In another embodiment, the automation settings apparatus 104 includes a matching module 204 configured to compare the one or more received automation settings to one or more corresponding local automation settings. In certain embodiments, the matching module 204 performs a one-to-one comparison between one or more automation settings received from a sharing participant 102b and one or more local automation settings associated with the receiving participant 102a. In another embodiment, the matching module 204 converts one or more received automation settings to a comparable format associated with one or more local automation settings. For example, the matching module 204 may convert one or more climate control settings from Celsius to Fahrenheit.

In some embodiments, the matching module 204 does not compare one or more settings that have been flagged by the user. For example, the user may not desire the temperature to be adjusted based on one or more received automation settings. Thus, the matching module 204 may not perform one or more settings comparisons associated with the temperature settings of the climate control system. In another embodiment, the matching module 204 does not perform comparisons for one or more received automation settings that do not have corresponding local automation settings. For example, the matching module 204 may not perform a comparison for a received humidity setting of a climate control system if the local climate control system does not have a humidity setting.

In one embodiment, the automation settings apparatus 104 includes a regulating module 206 configured to adjust the one or more local automation settings based on the comparison of the one or more received automation settings to the one or more corresponding local automation settings. The regulating module 206, for example, may adjust temperature settings of a climate control system, either up or down, based on a temperature setting received from a sharing participant 102b. For example, if the local temperature setting is 75° F. and a received temperature setting is 76° F., the regulating module 206 may adjust the local temperature setting to 76° F. In another example, the regulating module 206 may adjust one or more irrigation settings, such as changing the starting times for turning the lawn sprinklers on, setting the duration of the lawn sprinklers, and/or the like. For example, if the local starting time setting is 6:30 AM, and a received starting time from a sharing participant 102b is 5:30 AM, the regulating module 206 may adjust the local starting time to 5:30 AM.

In certain embodiments, the regulating module 206 processes multiple received automation settings associated with a single corresponding local automation setting. For example, the regulating module 206 may analyze multiple temperature settings received from a plurality of sharing participants 102b to determine whether and how to adjust the local temperature setting. In certain embodiments, the regulating module 206 may average multiple values associated with one or more received automation settings and adjust a corresponding local automation setting to the average value. For example, if the received temperature values from three sharing participants 102b are 71° F., 72° F., and 73° F., the regulating module 206 may set the local temperature setting to 72° F., which is the average of the three received values. In further embodiments, the regulating module 206 may use different methods to process multiple values associated with an automation setting and determine an appropriate value for the corresponding local automation setting, such as determining a standard deviation, a weighted average, and/or the like.

In a further embodiment, the regulating module 206 incorporates additional received information to determine whether and how to adjust the one or more local automation settings. For example, the regulating module 206 may give more weight to automation settings received from sharing participants 102b in close proximity to the receiving participant 102a. Alternatively, the regulating module 206 may give more weight to automation settings received from sharing participants 102b located in similar climate regions as the receiving participant 102a. In some embodiments, the regulating module 206 compares the additional information associated with the received automation settings to local information, such as the local climate, regional characteristics (such as crime rates), and/or the like.

In another embodiment, the regulating module 206 sends a notification to a user to alert them of possible adjustments, warnings, alerts, and/or the like, associated with the one or more received automation settings. In a simple example, the regulating module 206 may send a text message to the user in response to adjusting the temperature of the user's home up or down. In another example, the regulating module 206 may send a more urgent text message to the user in response to one or more home security settings being adjusted. The regulating module 206 may send a notification using various methods, such as SMS, automated voice message system, email, and/or the like. In another embodiment, the regulating module 206 uses the notification module 312, described below, to send a notification to the user.

Figure 3:
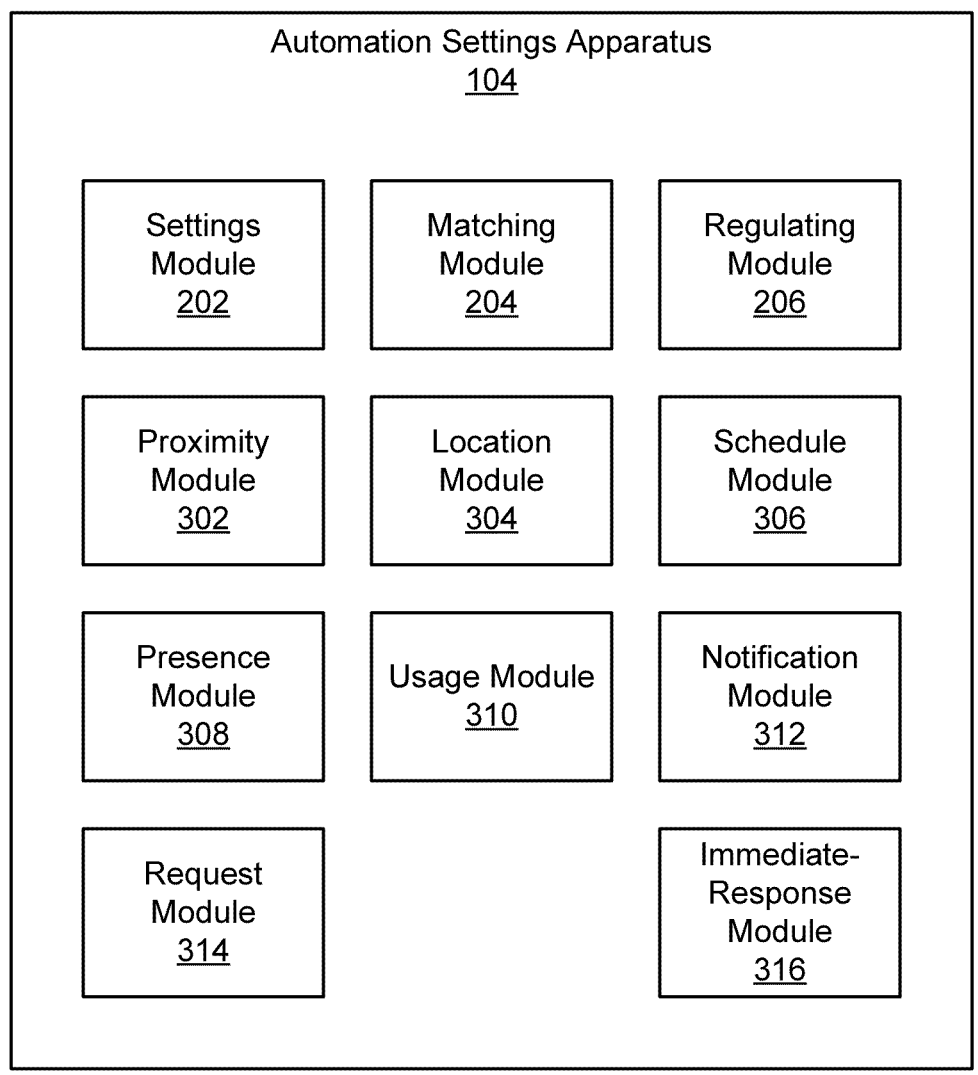
FIG. 3 is a schematic block diagram illustrating another embodiment of an apparatus for optimizing automation settings using crowdsourcing in accordance with the present subject matter.

FIG. 3 depicts another embodiment of an apparatus 300 for optimizing automation settings using crowdsourcing. In one embodiment, the apparatus 300 includes an automation settings apparatus 104. The automation settings apparatus 104, in certain embodiments, includes a settings module 202, a matching module 204, and a regulating module 206, which are substantially similar to the settings module 202, matching module 204, and regulating module 206 described with reference to FIG. 2. The automation settings apparatus 104, in a further embodiment, includes a proximity module 302, a location module 304, a schedule module 306, a presence module 308, a usage module 310, a notification module 312, a request module 314, and an immediate-response module 316, which are described below.

The automation settings apparatus 104, in one embodiment, includes a proximity module 302 configured to determine the geographic proximity to a sharing participant 102b. The sharing participant 102b, in certain embodiment, is associated with the one or more received automation settings. In some embodiments, the one or more local automation settings are adjusted according to the geographic proximity, as determined by the proximity module 302. For example, automation settings received from a physically closer sharing participant 102b may be given priority by the regulating module 206 over automation settings received from a different sharing participant 102b that may not be as physically close to the receiving participant 102a.

The proximity module 302, in some embodiments, assigns a rank, weighting, and/or the like, to the one or more automation settings associated with a sharing participant 102b according to the determined geographic proximity between a receiving participant 102a and a sharing participant 102b. For example, the proximity module 302 may assign a higher rank to the automation settings associated with a sharing participant 102b that is in close proximity to the receiving participant 102a, such that the regulating module 206 may incorporate higher ranked settings more than lower ranked settings because it is likely more relevant to the location of the receiving participant 102a.

In an example embodiment, a potential break-in at the location of a sharing participant 102b may cause the sharing participant 102b to broadcast security settings to one or more receiving participants 102a. The proximity module 302 may determine the proximity of the sharing participant 102b to the receiving participant 102a to determine whether the regulating module 206 associated with the receiving participant 102a should adjust one or more local security settings in response to the received security settings. If the sharing participant 102b is not within a predetermined proximity to the receiving participant 102a, as determined by the proximity module 302, then the regulating module 206 may not adjust any local security settings. On the other hand, if the proximity module 302 determines the sharing participant 102b is within close proximity to the receiving participant 102a, the regulating module 206 may adjust one or more local security settings associated with the receiving participant 102a.

In another embodiment, the automation settings apparatus 104 includes a location module 304 configured to receive location specific data associated with the one or more sharing participants 102. For example, the location module 304 may determine location specific data associated with climate control settings, such as exterior temperatures, weather patterns, precipitation, humidity levels, and/or the like, for both the sharing participant 102b and the receiving participant 102a. The matching module 204 may incorporate the location specific data when comparing the one or more received automation settings with one or more local automation settings to determine whether the regulating module 206 should adjust the one or more local automation settings based on the received automation settings.

For example, a receiving participant 102a that receives one or more climate control system settings from a sharing participant 102b that is located in a similar climate region as the receiving participant's 102a may adjust one or more local climate control system settings in response to the location module 304 determining the location specific data of the sharing participant 102b is similar to the receiving participant 102a. On the other hand, a receiving participant 102a may ignore one or more received climate control settings in response to the location module 304 determining the sharing participant 102b is located in a dissimilar climate region, and, thus, does not share many location specific characteristics as the receiving participant 102a.

In one embodiment, the regulating module 206 incorporates location specific information received by the location module 304 to schedule local settings adjustments in the future. For example, location specific information received by the location module 304 from a sharing participant 102b that is not located in a similar climate region as the receiving participant 102a may be used to schedule climate control system settings in the future. The location module 304 may use location specific information received from a plurality of sharing participants 102b to calculate such things as weather patterns, which may be used to set future local automation settings. In another example, the location module 304 may receive security information from a plurality of sharing participants 102b, such as a string of break-ins within a neighborhood, to determine whether the break-ins are getting closer to the receiving participant's 102a location. If so, the regulating module 206 may react by adjusting one or more local security settings.

In one embodiment, the automation settings apparatus 104 includes a schedule module 306 configured to receive data associated with the one or more sharing participants 102b. In certain embodiments, the data comprises information associated with a schedule of a sharing participant 102b and may be used by the regulating module 206 to adjust one or more local automation settings. For example, if a user associated with a sharing participant 102b has not disabled their security system for a predefined amount of time (e.g., a week, a month, or the like), the schedule module 306 may determine that the user is on vacation and alert the regulating module 206 to possibly increase one or more local security settings because the out-of-town user's house may be a target of a security breach.

In another embodiment, the regulating module 206 uses the schedule information collected by the schedule module 306 to determine whether one or more local automation settings should be adjusted according to the automation settings received from the sharing participant 102*b*. For example, if a user associated with a sharing participant 102*b* sets the temperature of their climate control system to 75° F. for the duration of their vacation (e.g., 2 weeks), the regulating module 206 may not consider the climate data received from this sharing participant 102*b* in response to the schedule module 306 determining the user is out-of-town and not actively using their climate control system.

The automation settings apparatus 104, in a further embodiment, includes a presence module 308 configured to determine the presence of one or more sharing participants 102*b* and receive presence data associated with the one or more sharing participants 120*b*. In certain embodiments, the presence data comprises information associated with the presence of a sharing participant 102*b*. In one embodiment, the regulating module 206 associated with the receiving participant 102*a* adjusts one or more local automation settings in response to the presence module 308 determining the presence of the user and/or a user's pet.

For example, if the presence module 308 determines that a user is home, the regulating module 206 associated with the receiving participant 102*a* may use this information to give a higher rank/weight to received climate control settings associated with the sharing participant 102*b* because the user may be actively using their climate control system. On the other hand, if the presence module 308 determines the user is not home, the regulating module 206 associated with the receiving participant 102*a* may adjust one or more local security settings because the user's home may be a target of a security breach. In this example, the regulating module 206 may use the presence data received by the presence module 308 together with the proximity data determined by the proximity module 302 to determine whether and/or how to adjust the local security settings. The presence data, in certain embodiments, may also be used by the schedule module 306 to determine the schedule of the user associated with the sharing participant 102*b*.

In certain embodiments, the presence module 308 establishes the presence of a sharing participant 102*b* in response to a user entering a passcode at a control panel, such as a security system control panel, a climate control system control panel, and/or the like. In another embodiment, the presence module 308 establishes the presence of a sharing participant 102*b* in response to sensing the opening of an entryway, such as a door, window, or the like. In a further embodiment, the presence module 308 receives audio and/or video signals to establish a sharing participant 102*b* is present.

In certain embodiments, the automation settings apparatus 104 includes a usage module 310 configured to receive energy usage data associated with the one or more sharing participants 102*b*. In certain embodiments, the energy usage data received by the usage module 310 is used by the regulating module 206 associated with receiving participant 102*a* to determine whether and/or how to adjust one or more local automation settings. For example, the usage module 310 may determine that climate control systems of sharing participants 102*b* within close proximity to the receiving participant 102*a* are two degrees cooler during peak hours, in which electricity is the most expensive, than the receiving participant 102*a* and may notify the regulating module 206 to adjust one or more local climate control settings accordingly.

In some embodiments, the energy usage data includes water usage, broadband usage, gas usage, and/or any other measureable resource that is consumed by a participant 102. In certain embodiments, the usage module 310 alerts a user, such as by sending a text message, an email, and/or the like, of the current energy usage of the user's automated system and the usage data of the surrounding sharing participants 102*b*. The usage module 310, in some embodiments, creates forecasts and reports that are sent to the user associated with the usage module 310. The forecasts and reports may contain cost information, comparative statistics based on sharing participants 102*b* within close proximity to the user, and/or the like.

In another embodiment, the automation settings apparatus 104 includes a notification module 312 configured to send a notification to a sharing participant 102*b* in response to modification of the one or more local automation settings associated with the sharing participant 102*b*. For example, after the regulating module 206 adjusts one or more local automation settings, the notification module 312 may notify the sharing participant 102*b* that one or more local automation settings were adjusted. Thus, in one example, if the regulating module 206 adjusts one or more local climate control settings, such as turning the temperature down, the notification module 312 may notify the owner/user of the temperature change.

In some embodiments, the notification module 312 sends notifications using text messages, emails, automated voice recordings, and/or the like. In other embodiments, a user customizes the notifications sent by the notification module 312, such as the content of the notification, the types of notifications to receive, how to receive the notifications, and/or the like. For example, a user may not want to receive notifications in response to the regulating module 206 adjusting the temperature of the climate control system. However, the user may want to receive any notifications associated with changes in the user's security system settings. Thus, the user may have the ability to specify what kinds of notifications to receive.

The automation settings apparatus 104, in one embodiment, includes a request module 314 configured to invite one or more non-participants having one or more shareable automation settings to share the one or more shareable automation settings with the one or more sharing participants 102*b*. The request module 314 may send an invitation to a non-participant using a variety of communication methods, such as a social network (e.g., Facebook®, Twitter®, and/or the like), email, text message, and/or the like. In another embodiment, the request module 314 sends an invitation to a non-participant using a smart automation device, such as a smart climate control system, smart security system, and/or the like.

In another embodiment, the automation settings apparatus 104 includes an immediate-response module 316 configured to receive immediate-response data from one or more sharing participants 102*b*. In some embodiments, the immediate-response data comprises information associated with one or more events associated with one or more sharing participants 102*b*, such as a broken window, a power outage, an alarm system being set-off, and/or the like. For example, if the home of a sharing participant 102*b* experiences a broken window, which may indicate a potential break-in, the security system associated with the sharing participant 102*b* may broadcast data associated with the potential break-in, which may include event specific data about the broken window (e.g., time the window was broken, the status of other entryways, and/or the like). The immediate-response module 316 associated with the receiving participant 102*a* may immediately increase one or more local security settings, such as turning on exterior lights, notifying local authorities and/or the user/owner, and/or the like, in response to receiving immediate-response data associated with the broken window. In one embodiment, the immediate-response module 316 immediately adjusts the one or more local automation settings without the matching module 204 comparing the received immediate-response data to one or more local automation settings. Thus, the local automation system may react without additional processing to determine whether it should react. In certain embodiments, the adjustment module 206 immediately adjusts the one or more local automation settings in response to receiving immediate-response data.

Figure 4:
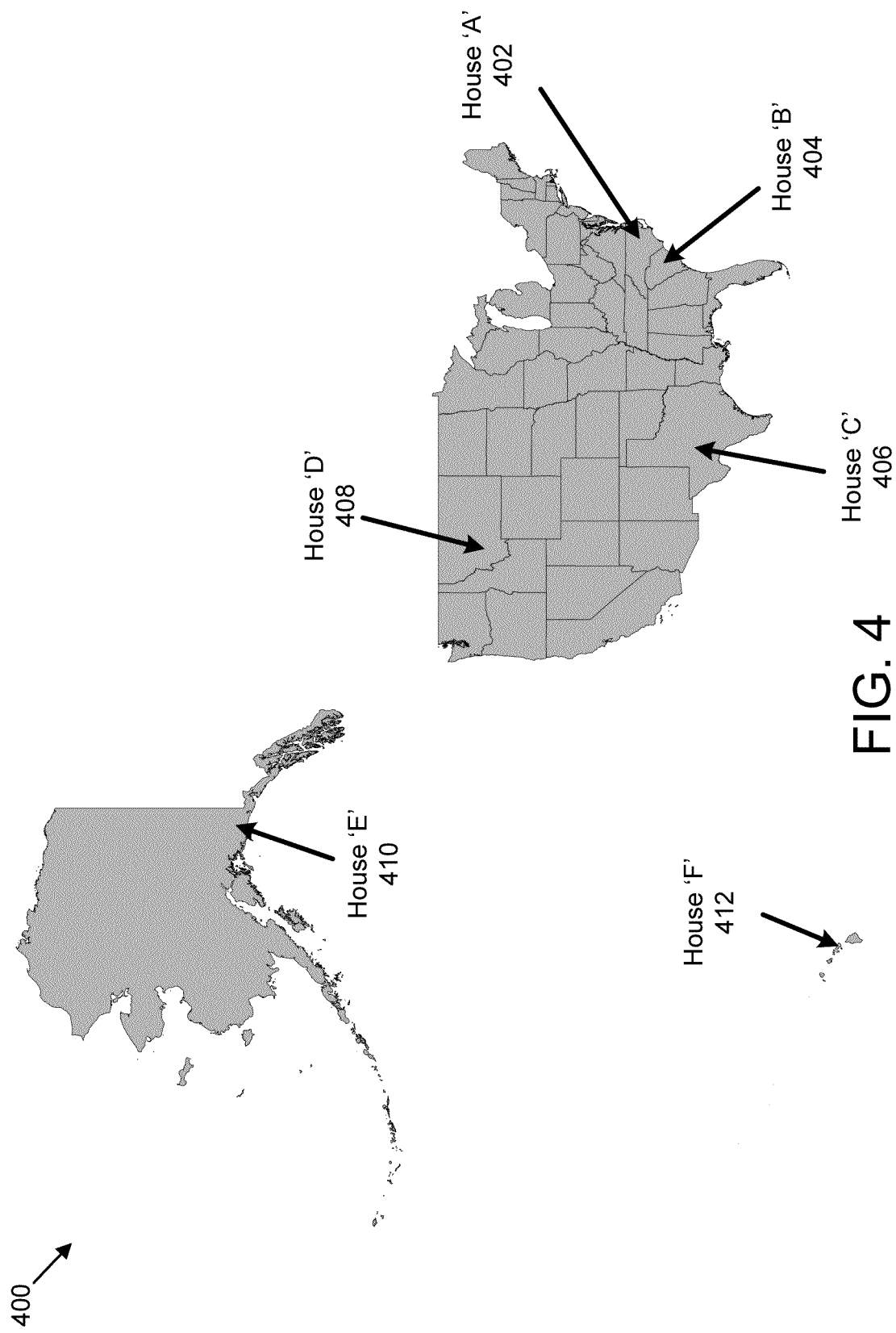
FIG. 4 illustrates one embodiment of using location information to optimize automation settings in accordance with the present subject matter.

FIG. 4 depicts one embodiment 400 of using location information to optimize automation settings. In the depicted embodiment, house 'A' 402 may be the receiving participant 102a. Houses 'B'-'F' 404-412 may be sharing participants 102b sharing one or more automation settings with house 'A' 402. The location module 304 may receive location information for each of houses 'B'-'F' 404-412, which may be processed by the matching module 204 and/or the regulating module 206 in order to determine whether the received automation settings associated with the location information should be considered.

For example, climate control information from house 'E' 410 would probably not be processed by the regulating module 206 associated with house 'A' 402 because of the climate differences between where house 'E' 410 and house 'A' 402 are located. However, the regulating module 206 associated with house 'A' 402 may process location information associated with house 'B' 404 because of the similarities in the climate regions between the locations of house 'A' 402 and house 'B' 404. Alternatively, the location module 304 may store location information associated with houses 'C'-'F' 406-412 for future reference by the regulating module 206 if they location information may help determine future events, such as weather patterns, or the like.

Figure 5:
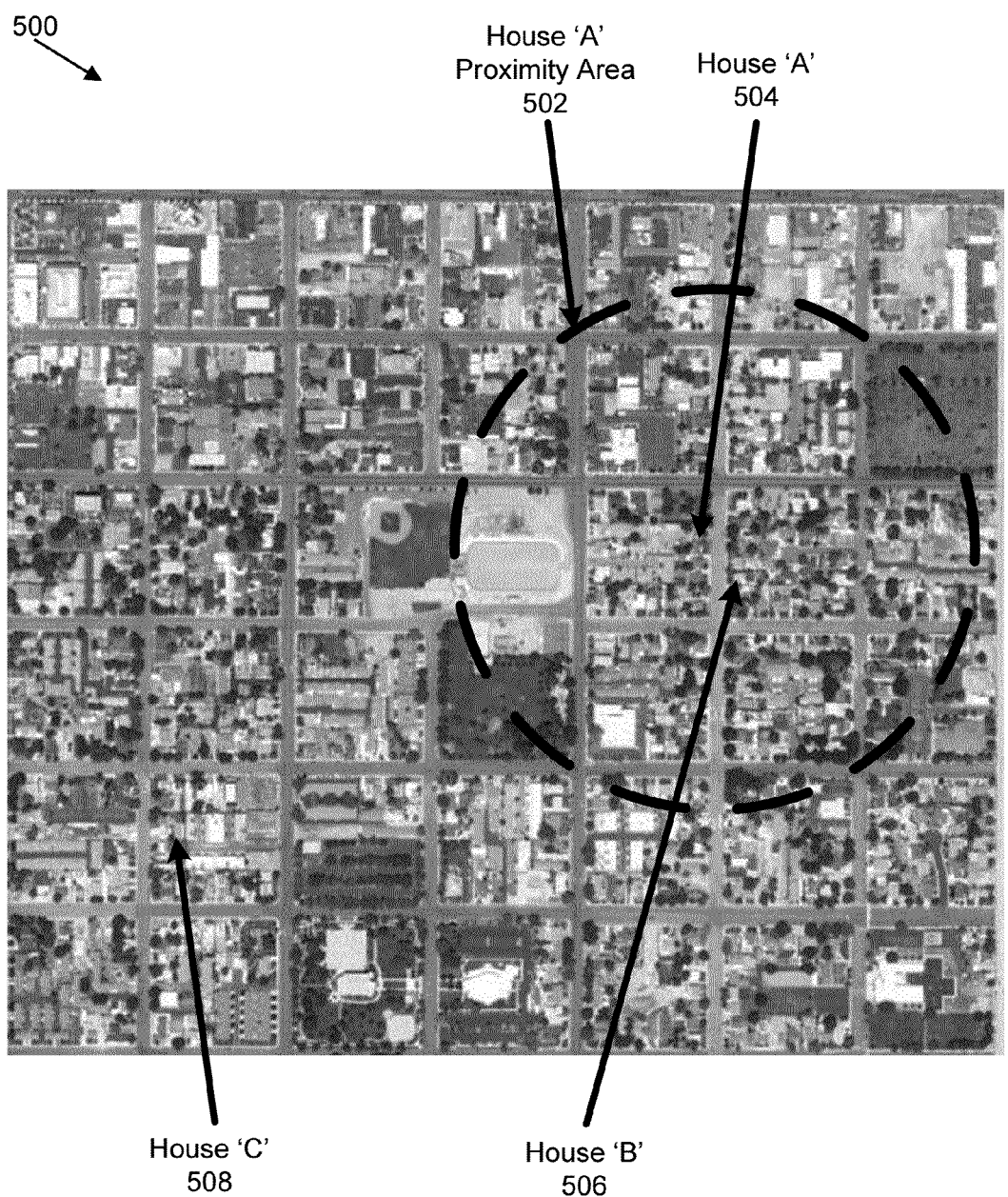
FIG. 5 illustrates one embodiment of using proximity information to optimize automation settings in accordance with the present subject matter.

FIG. 5 depicts one embodiment 500 of using proximity information to optimize automation settings. In the depicted embodiment, a proximity area 502 is established around house 'A' 504, which may determine the received automation settings to be processed by the regulating module 206 associated with house 'A' 504. In one embodiment, the proximity module 302 establishes the proximity area 502 and may increase or decrease the proximity area 502 as desired by the user. In certain embodiments, automation settings received by the settings module 202 will not be considered by the matching module 204 and/or the regulating module 206 unless they are received from a sharing participant 102b within the proximity area 502.

In one example, one or more security settings received from house 'B' 506 may be given more weight than one or more security settings received from house 'C' 508 because house 'B' 506 is within the proximity area 502 of house 'A' 504. Thus, if house 'B' 506 experiences a break-in and the security system associated with house 'B' 506 broadcasts a potential break-in, the security system of house 'A' 504 may immediately respond by increasing its security settings (e.g., turning interior/exterior lights on, alerting local authorities, and/or the like) in response to the potential break-in. On the other hand, if the security system associated with house 'C' 508 broadcasts a potential break-in, the security system associated with house 'A' 504 may not respond immediately, if at all, because house 'C' is not within the proximity area 502 established by the proximity module 302.

Figure 6:
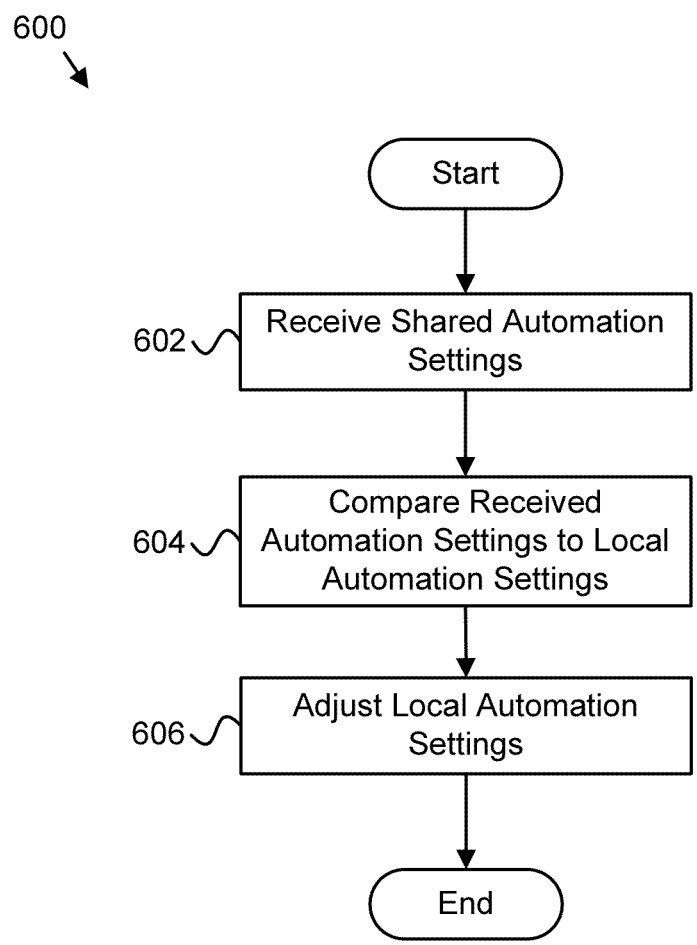
FIG. 6 is a schematic flow chart diagram illustrating one embodiment of a method for optimizing automation settings using crowdsourcing in accordance with the present subject matter.

FIG. 6 depicts one embodiment of a method 600 for optimizing automation settings using crowdsourcing. In one embodiment, the method 600 begins and a settings module 202 receives 602 one or more automation settings from one or more sharing participants 102b In certain embodiments, a matching module 204 compares 604 the received automation settings to one or more local automation settings. In a further embodiment, a regulating module 206 adjusts 606 the one or more local automation settings based on the comparison of the one or more received automation settings to the one or more corresponding local automation settings and the method 600 ends.

Figure 7:
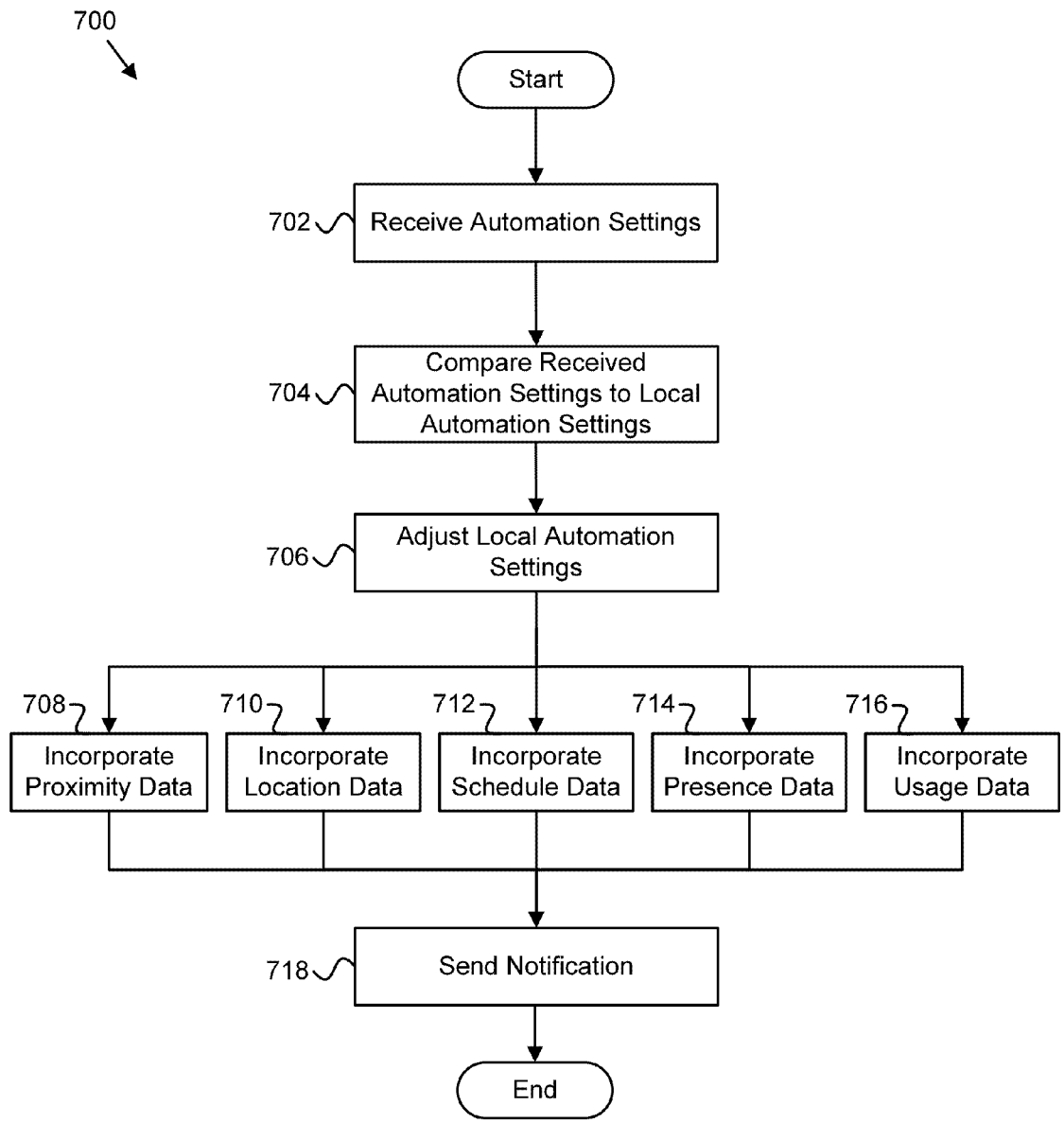
FIG. 7 is a schematic flow chart diagram illustrating another embodiment of a method for optimizing automation settings using crowdsourcing in accordance with the present subject matter.

FIG. 7 depicts another embodiment of a method 700 for optimizing automation settings using crowdsourcing. In one embodiment, the method 700 begins and a settings module 202 receives 702 one or more automation settings from one or more sharing participants 102b. In certain embodiments, the one or more automation settings include climate control settings, security system settings, irrigation settings, home entertainment settings, and/or the like. In another embodiment, a matching module 204 compares 704 the received automation settings to one or more local automation settings. In certain embodiments, the matching module 204 formats one or more received automation settings such that the matching module 204 can perform a one-to-one cross-comparison of the received automation settings and the local automation settings.

In certain embodiments, a regulating module 206 adjusts 706 one or more local automation settings based on the comparison of the one or more received automation settings to the one or more corresponding local automation settings. For example, the regulating module 206 may adjust the temperature of a local climate control system in response to receiving a temperature setting from a sharing participant 102b that is different than the local temperature setting.

In certain embodiments, the regulating module 206 incorporates additional data associated with the sharing participants 102b. In one embodiment, the regulating module 206 incorporates 708 proximity data as determined by a proximity module 302. For example, received automation settings from a sharing participant 102b within close proximity to the receiving participant 102a may be given more weight than automation settings received from a sharing participant 102b that is not within close proximity to the receiving participant 102a.

In a further embodiment, the regulating module 206 incorporates 710 location data as determined by a location module 304. In some embodiments, location data includes climate characteristics, crime characteristics, and/or the like. For example, a climate settings received from a sharing participant 102b within a similar climate region as the receiving participant 102a may be given more emphasis than climate settings received from a sharing participant 102b not within a similar climate region as the receiving participant 102a.

In another embodiment, the regulating module 206 incorporates 712 data associated with the schedule of a sharing participant 102b as determined by a schedule module 306. For example, the receiving participant 102a may increase its local security settings in response to the schedule module 306 determining that a sharing participant 102b within close proximity to a receiving participant 102a is not home, which may make their home a higher risk target for a potential break-in.

In one embodiment, the regulating module 206 incorporates 714 presence data as determined by a presence module 308. The presence module 308 may determine whether a home owner, pet, employee, or the like, is present in the location associated with the sharing participant 102b. If not, the receiving participant 102a may take action in response to determining the sharing participant 102b is not present. For example, the regulating module 206 associated with the receiving participant 102a may increase one or more local security settings in response to the presence module 308 determining the sharing participant 102b is not present.

In certain embodiments, the regulating module 206 incorporates 716 usage data as determine by a usage module 304. In certain embodiments, the usage data may include electricity usage, water usage, gas usage, broadband usage, and/or the like of one or more sharing participants 102b. The regulating module 206 may adjust one or more local automation settings in order to keep local usage consistent with one or more sharing participant's 102b usage. Alternatively, the regulating module 206 may notify the receiving participant 102a of their usage rate compared to one or more sharing participants 102b.

In one embodiment, a notification module 312 sends 718 a notification to a participant 102 in response to one or more local automation settings being changed by the regulating module 206. For example, the notification module 312 may send a text message, email, automated voice recording, Facebook® message, and/or the like, to the receiving participant 102a in response to the regulating module 206 adjusting the temperature of the climate control system. The notification may include information regarding the temperature change, such as the temperature before and after the change, the average temperature of one or more sharing participants 102b, and or the like. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, at a first automation device at a first property, an automation setting from a sharing participant, the automation setting being associated with the sharing participant, the sharing participant comprising a second automation device located at a second property different than the first property, the first and second automation devices configured to control one or more systems of a property, wherein the first and second automation devices are in direct communication over a data network;
determining a geographic proximity of the first automation device to the second automation device, the received automation setting being assigned a weight based on the determined geographic proximity;
comparing the received automation setting to a corresponding local automation setting of the first automation device; and
adjusting the local automation setting as a function of the assigned weight of the received automation setting in response to the received automation setting being different than the corresponding local automation setting.

2. The method of claim 1, further comprising receiving location specific data associated with the sharing participant, the local automation setting being adjusted according to the location specific data.

3. The method of claim 1, further comprising receiving data associated with the sharing participant, the local automation setting being adjusted according to the data, the data comprising information associated with a schedule of the sharing participant.

4. The method of claim 1, further comprising receiving presence data associated with the sharing participant, the local automation setting being adjusted according to the presence data, the presence data comprising information associated with the presence of the sharing participant.

5. The method of claim 1, further comprising receiving energy usage data associated with the sharing participant, the local automation setting being adjusted according to the energy usage data.

6. The method of claim 1, further comprising sending a notification in response to modification of the local automation setting, the notification comprising information associated with the local automation setting.

7. The method of claim 1, further comprising inviting a non-participant having a shareable automation setting to share the shareable automation setting.

8. The method of claim 1, further comprising receiving immediate-response data, the immediate-response data comprising information associated with an event, the event associated with a sharing participant, wherein the local automation setting is immediately adjusted based on the immediate-response data.

9. An apparatus comprising:
a first automation device comprising a processor;
a memory that stores machine readable code executable by the processor;
a settings module that receives an automation setting on the first automation device from a sharing participant, the automation setting being associated with the sharing participant, the sharing participant comprising a second automation device located at a second property different than the first property, the first and second automation devices configured to control one or more systems of a property, wherein the first and second automation devices are in direct communication over a data network;
a matching module that compares the received automation setting to a corresponding local automation setting of the first automation device;
a proximity module that determines a geographic proximity of the first automation device to the second automation device, the received automation setting being assigned a weight based on the determined geographic proximity; and
a regulating module that adjusts the local automation setting as a function of the assigned weight of the received automation setting in response to the received automation setting being different than the corresponding local automation setting.

10. The apparatus of claim 9, further comprising a location module that receives location specific data associated with the sharing participant, the local automation setting being adjusted according to the location specific data.

11. The apparatus of claim 9, further comprising a schedule module that receives data associated with the sharing participant, the local automation setting being adjusted according to the data, the data comprising information associated with a schedule of the sharing participant.

12. The apparatus of claim 9, further comprising a presence module that receives presence data associated with the sharing participant, the local automation setting being adjusted according to the presence data, the presence data comprising information associated with the presence of the sharing participant.

13. The apparatus of claim 9, further comprising a usage module that receives energy usage data associated with the sharing participant, the local automation setting being adjusted according to the energy usage data.

14. The apparatus of claim 9, further comprising a notification module that sends a notification in response to modification of the local automation setting, the notification comprising information associated with the local automation setting.

15. The apparatus of claim 9, further comprising a request module that invites a non-participant having a shareable automation setting to share the shareable automation setting.

16. The apparatus of claim 9, further comprising an immediate-response module that receives immediate-response data, the immediate-response data comprising information associated with an event, the event associated with the sharing participant, wherein the local automation setting is immediately adjusted based on the immediate-response data.

17. A program product comprising a non-transitory computer readable storage medium storing machine readable code executable by a processor to perform:

receiving, at a first automation device, an automation setting from a sharing participant, the automation setting being associated with the sharing participant, the sharing participant comprising a second automation device located at a second property different than the first property, the first and second automation devices configured to control one or more systems of a property, wherein the first and second automation devices are in direct communication over a data network;

determining a geographic proximity of the first automation device to the second automation device, the received automation setting being assigned a weight based on the determined geographic proximity;

comparing the received automation setting to a corresponding local automation setting of the first automation device; and adjusting the local automation setting as a function of the assigned weight of the received automation setting in response to the received automation setting being different than the corresponding local automation setting.

18. The program product of claim 17, wherein the machine readable code further performs receiving immediate-response data, the immediate-response data comprising information associated with an event, the event associated with the sharing participant, wherein the local automation setting is immediately adjusted based on the immediate-response data.

\* \* \* \* \*